United States Patent [19]

Heinz

[11] Patent Number: 4,936,750
[45] Date of Patent: Jun. 26, 1990

[54] ROTOR FOR A WIND-DRIVEN GENERATOR

[76] Inventor: Albert K. Heinz, Calle 77 A, No. 11 - 92, Bogota, Colombia

[21] Appl. No.: 261,765

[22] Filed: Oct. 24, 1988

Related U.S. Application Data

[62] Division of Ser. No. 894,559, Aug. 8, 1986, Pat. No. 4,822,247.

[51] Int. Cl.⁵ .................................................. F03D 1/06
[52] U.S. Cl. .............................. 416/196 A; 416/189; 416/132 B
[58] Field of Search ............... 416/189 A, 194 A, 195, 416/196 A, 225, 132 B

[56] References Cited

U.S. PATENT DOCUMENTS

| 543,460 | 7/1895 | Bramwell | 416/195 |
| 1,739,866 | 12/1929 | Schuh | 416/189 A |
| 2,855,179 | 10/1968 | Brown . | |
| 3,695,780 | 10/1972 | Velkoff | 416/189 |
| 4,319,865 | 3/1982 | Richard | 416/139 A X |
| 4,330,714 | 5/1982 | Smith | 416/196 A X |

FOREIGN PATENT DOCUMENTS

| EP0015131 | 9/1980 | European Pat. Off. | 416/85 |
| EP0016602 | 10/1980 | European Pat. Off. | 416/196 A |
| 3037694 | 5/1982 | Fed. Rep. of Germany | 416/196 A |
| 1511042 | 1/1968 | France | 416/132 B |
| 77572 | 6/1981 | Japan | 416/189 A |
| 437924 | 11/1967 | Switzerland . | |
| 437927 | 11/1967 | Switzerland . | |
| 259068 | 10/1926 | United Kingdom | 416/121 A |

*Primary Examiner*—Everette A. Powell, Jr.
*Attorney, Agent, or Firm*—Arnold, White & Durkee

[57] ABSTRACT

The present invention refers to a rotor for a fluid-kinetic machine comprising a rotatably supported hub, the support being provided with axial bearing means, an outer ring which is indirectly supported on said hub, and rotor blades which are arranged in an area between said hub and said outer ring. In order to provide a possibility of utilizing the influence of the gyroscopic effects, which occur during operation of the rotor, for the purpose of stabilizing the rotor, it is suggested in accordance with the invention that the outer ring should be composed of a plurality of arcuate sections in the circumferential direction and should be arranged essentially in the plane of rotation of the axial bearing means, and that the arcuate sections of the outer ring should be under the action of flexible tension elements which embrace said arcuate sections at least partly and which are secured to a carrier ring.

1 Claim, 2 Drawing Sheets

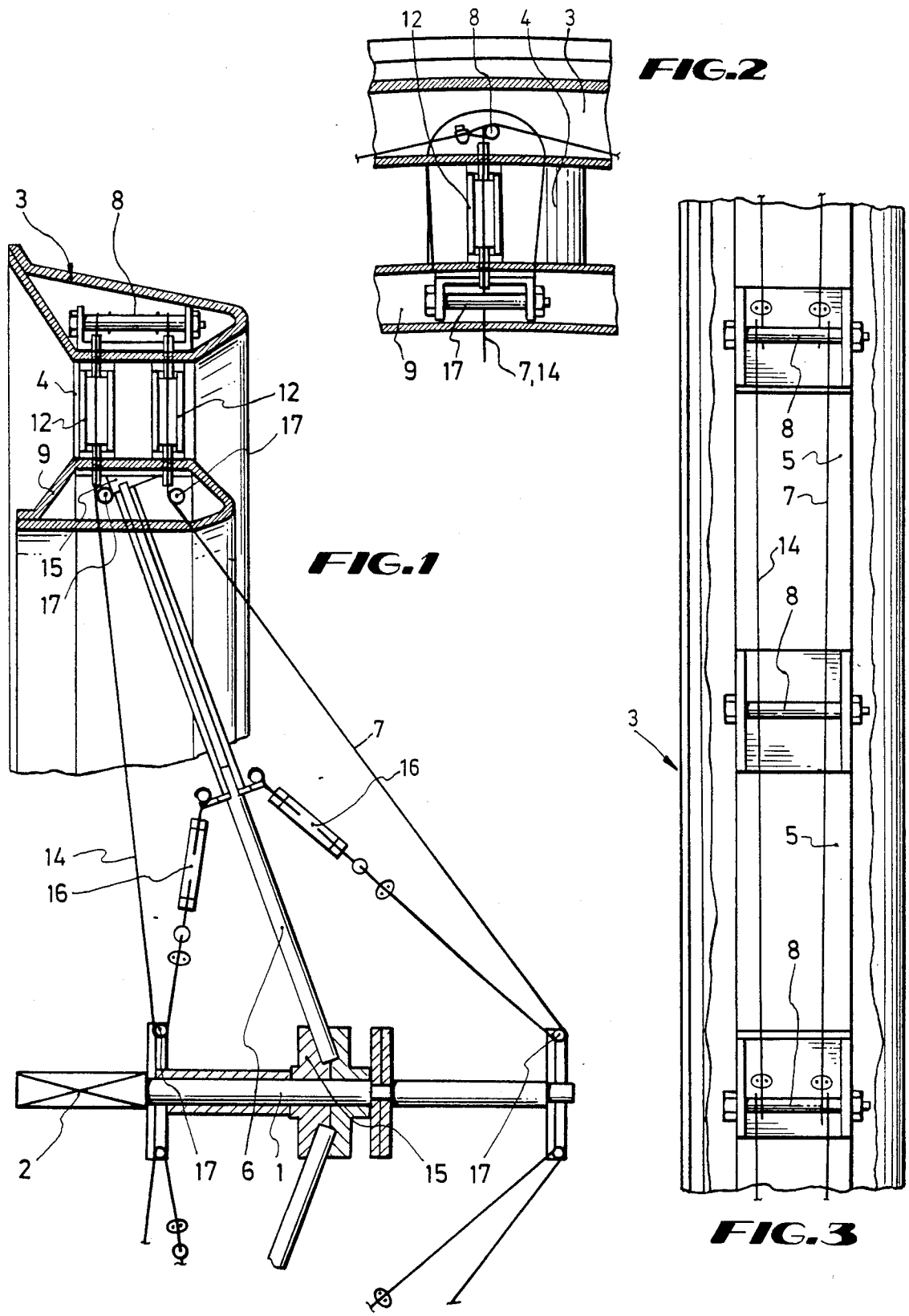

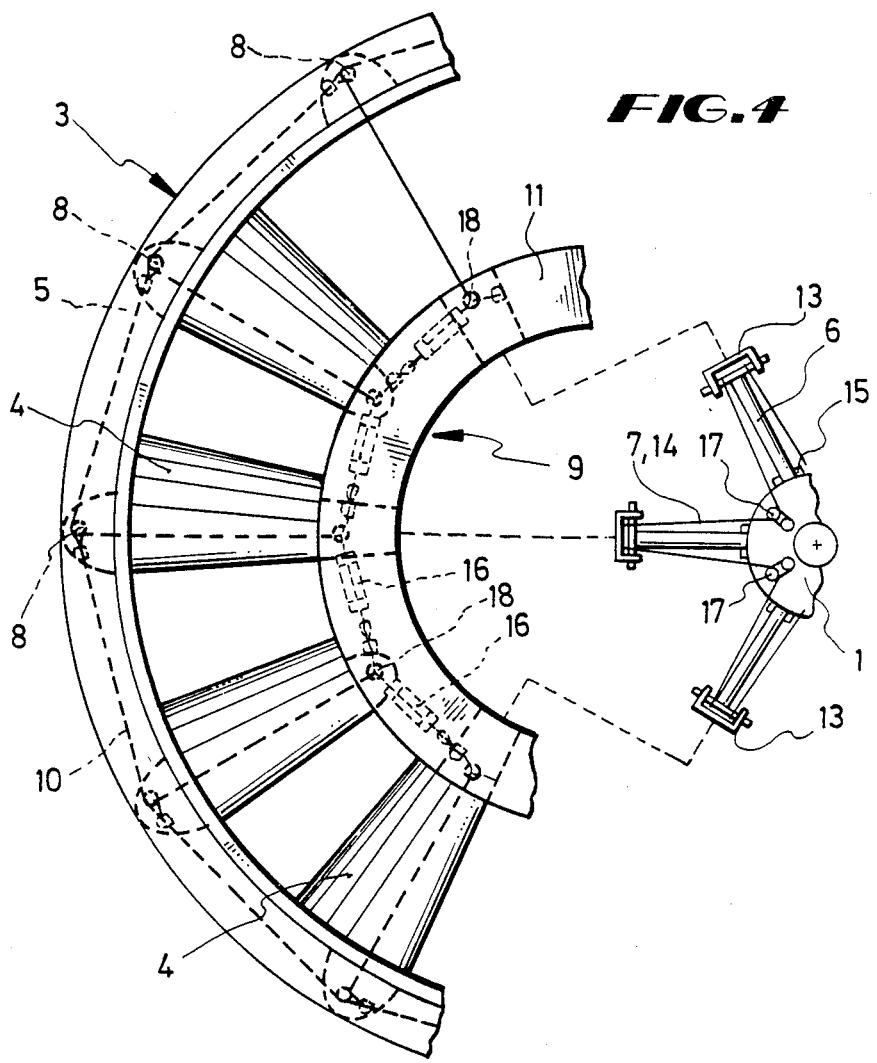
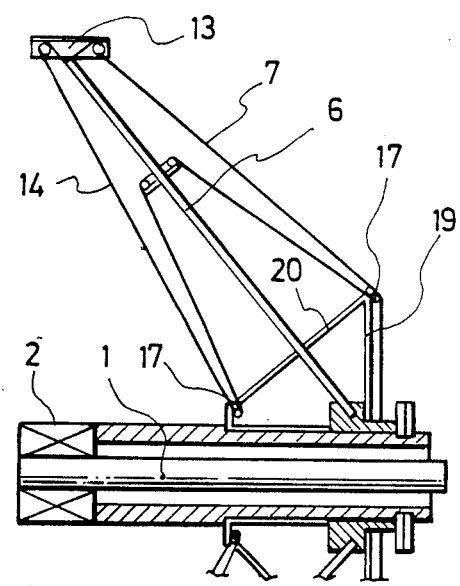

ROTOR FOR A WIND-DRIVEN GENERATOR

DESCRIPTION

This is a divisional of application, Ser. No. 894,559, filed Aug. 8, 1986, now U.S. Pat. No. 4,822,247.

A known rotor for a wind-driven generator, which comprises a rotatably supported hub and in the case of which the support is provided with axial bearing means, is equipped with an outer ring, which is indirectly supported on said hub, and with rotor blades which are arranged in an area between said hub and said outer ring. In order to guarantee economical operation in the case of wind-driven generators provided with such a rotor, it is necessary to construct the rotor such that it has suitably large dimensions. In particular with regard to alternative possibilities of energy generation, a great variety of structural designs of such rotors has already been suggested and tested under practical conditions. A disadvantage which is common to the hitherto known rotors primarily is to be seen in the fact that said rotors have a verly largy mass because of the required mechanical strength. Due to the gyroscopic effects produced, this large mass subjects the bearings to an excessive load, and, in spite of detailed calculations, it is very difficult to estimate said load in advance. This had the effect that many tests with big wind systems failed. An additional problem arising in the case of such rotors is the lack of balance of the rotating components. In particular in the case of big rotors it is practically impossible to balance these rotors before they are installed in the wind power station in question. Due to the size of the rotor and the manifold influence and interference factors, it is practically impossible to balance the rotor when it has been installed. Hence, known rotors are markedly unstable in the case of higher speeds so that, e.g. at higher wind speeds, the rotor of a wind power station must be stopped.

U.S. Pat. No. 36 95 780 discloses a rotor, which is to be used for a helicopter or for a similar vehicle. The rotor is provided with an outer ring, which is indirectly supported on a hub and which is arranged coaxially with said hub. Several rotor blades are arranged in the intermediate area between the outer ring and the hub. The outer ring is connected to the hub by means of a plurality of tension spokes. The hub is secured to the end of a driven shaft. In the case of this rotor, too, higher rotational speeds will have the effect that gyroscopic forces and moments will occur, and it is very complicated, if not impossible at all, to govern these forces and moments. A point which turns out to be particularly disadvantageous is the projecting mode of supporting the rotor at the end of the rotatable shaft. This causes additional moments which result in a precession of the gyroscope defined by the rotor.

Swiss-pat. 437 924 discloses a ring turbine blower provided with a blade carrier which is arranged axially with regard to a hub and which surrounds said hub. The blade carrier is connected to the hub by means of several spokes. The overall arrangement of the spokes, of the hub and of the blade carrier corresponds to the arrangement known from a bicycle. In this connection, it must be specially mentioned that the blade carrier is designed as an integral part in the form of a solid ring. Furhtermore, the spokes are not flexible, but are made of a high-strength material, such as steel or piano wire, and, consequently, they do not have any flexible properties whatsoever.

U.S. Pat. No. 2 855 179 discloses a turbine provided with an an annualar strip which is arranged coaxially with a hub. The strip is supported on the hub by means of spokes. Also in the case of the turbine known from this publication, the strip consists of a closed, integrally formed ring. A plurality of rotor blades is arranged between the hub and the strip, said rotor blades being fastened to the turbine, i.e. in particular to the strip. The fastening is effected in such a way that the spoke associated with each rotor blade penetrates said rotor blade, embraces the strip and is guided back to the hub through the same rotor blade. It follows that each of the spokes defines a single loop constituting a closed loop with regard to the rotor blade and the strip. In addition, the turbine is provided with an inner strip, which is integrally formed as well and which abuts on the radially inner ends of the rotor blades. The inner strip forms an elastic support means in this case and, consequently, it does not serve to fasten the rotor blades.

In comparison with this prior art, the invention is based on the task of providing a rotor of the type disclosed in the generic clause of claim 1, which has a simple, light and stable structural design and which permits such a mode of support that the gyroscopic effects occurring can be used for stabilizing the position of the rotor.

In accordance with the invention, this task is solved by means of the characterizing features of claim 1 in the case of a rotor according to the generic clause.

The rotor according to the invention which is used for a fluid-kinetic machine is characterized by substantial advantages. The outer ring is composed of a plurality of arcute sections in the circumferential direction; in this connection, the term arcuate sections need not be understood in a material sense. The outer ring can, however, be subdivided into several ideal arcuate sections. Due to the fact that the outer ring is arranged essentially in the plane of rotation of the axial bearing means, the gyroscopic effects occurring can be transferred in an optimum manner to the rotating axle or the rotating shaft and, consequently, to the suspension of the rotor. Additional bending moments or additional moments which might result in an uncontrolled precession of the rotor can be avoided in this manner. Another substantial advantage of the rotor according to the invention is to be seen in the fact that the arcuate sections of the outer ring are under the action of flexible tension elements, which embrace said arcuate sections at least partly and which are secured to a carrier ring. It is thus possible that even a rotor having a very large diameter is supported on the hub in such a way that a lack of balance is compensated while the rotor is running so that said rotor is self-balancing and guarantees a smooth and perfect operation, consequently. It follows that the load on the bearings is reduced to a minimum. The fact that the outer ring or rather its arcuate sections are under the action of tension elements additionally leads to a very stable overall structural design of the rotor, since the arcuate sections are, at least partly, embraced by the flexible tension elements and since, consequently, the centrifugal forces occurring can be dissipated via the flexible tension elements into the carrier ring.

A particularly advantageous structural design of the rotor is based on the features that the carrier ring is formed integrally with the hub and that the outer ring is supported on said hub by means of a plurality of pressure elements and flexible tension elements, and that, in the area where the respective pressure element is fastened, each flexible tension element is deflected in the circumferential direction on the outer ring and is secured to one of the arcuate sections of the outer ring which constitute the neighbouring arcuate sections in said circumferential direction. Due to this structural design, it is possible to construct the rotor in a very simple manner by using standardized components which are available on the market. Furthermore, the rotor is characterized by a very low total weight. Due to the fact that the carrier ring and the hub are formed integrally with each other, the highest possible strength of the whole construction is guaranteed. The use of pressure elements and tension elements offers the possibility of dimensioning these elements in a particularly weight-saving manner and, in particular, also the possibility of fastening said elements to the hub and to the outer ring in an extraordinary simple manner. Due to the fact that the respective flexible tension element is deflected and due to the fact that said tension element is fastened to a neighbouring arcuate section of the outer ring, the strength of said outer ring is additionally increased, without there being any necessity of designing said outer ring itself with higher strength.

Another advantageous embodiment is based on the feature that fastening of the respective tension element is effected in the deflection area of the neighbouring arcuate section of the outer ring or on the feature that fastening of the respective tension element is effected in the deflection area of the arcuate section of the outer ring following said respective neighbouring arcuate section. Depending on the dimensions of the rotor and its outer ring, it may prove advantageous to effect fastening of the respective tension element in one of the two abovementioned manners. The fact that a further arcuate section of the outer ring is additionally embraced can result in a further increase of the overall stability and the balancing operation, which takes place automatically, can thus be additionally improved.

An inner ring which is composed of arcuate sections and arranged coaxially with the outer ring and between which the rotor blades are arranged can prove to be advantageous as well. In this case, the rotor blades are not arranged such that they extend up to and into the area of the hub so that the support of the rotor remains freely accessible.

Furthermore, a particularly advantageous embodiment of the rotor according to the invention is based on the features that the carrier ring is formed by an inner ring which is arranged coaxially with the outer ring and which consists of a plurality of arcuate sections, that the rotor blades are arranged between the outer ring and the inner ring, that the inner ring is supported on the hub by means of a plurality of pressure elements and flexible tension elements and that the individual arcuate sections of the outer ring and of the inner ring are interconnected by means of a plurality of flexible tension elements. In the case of such a structural design, the outer ring, the rotor blades as well as the carrier ring, which is formed by the inner ring, define an inherently stable structure, which, in addition to the advantages which have already been described hereinbefore, shows the further advantage that the weight of the rotor can be reduced even more. In addition, it is possible to prefabricate the rotor independently of the hub and to support it on the hub by means of the pressure elements and the tension elements only when it has arrived at the place of installation.

Due to the fact that the respective flexible tension element is secured to the outer circumference of an arcuate section of the outer ring and to the inner circumference of an arcuate section of the inner ring, the arcuate sections in question are almost fully embraced. The stability of the overall system is this substantially increased once more.

Another feature which proves to be advantageous is that the pressure element and the tension element are, in their respective radially outer areas, supported on a carrier which is adapted to be brought into engagement with the inner ring. It is thus possible to prefabricate not only the main part of the rotor consisting of the outer ring and of the inner ring, but also the bearing arrangement, which is positioned on the side of the hub and which consists of pressure elements and of tension elements. The final assembly of the rotor is thus substantially simplified. An advantageous embodiment of the rotor according to the invention is additionally provided by the feature that a respective pressure element and a respective flexible tension element are arranged axially with regard to each other and in an axially displaced relationship with regard to the plane of rotation of the outer ring. It is thus possible to arrange the rotor in the plane of rotation of the axial bearing means, whereas the fastening elements of said rotor are located in an area outside of said axial bearing means so that, on the one hand, said axial bearing means is accessible at any time and, on the other hand, it can be incorporated into a carrier construction for the rotor in a suitable manner.

It also turns out to be advantageous that there is provided a respective second flexible tension element which is arranged axially with regard to the pressure element and in opposite relationship with the first tension element. Such a mode of supporting the outer ring and/or the inner ring on the hub guarantees even greater stability and strength in the axial direction. Furthermore, the dimensions of the flexible tension elements can be reduced, and this can result in a further reduction of weight.

In the following, the invention will be described on the basis of embodiments in connection with the drawing, in which:

FIG. 1 shows a side view, part of which is a sectional view, of part of a first embodiment, FIG. 2 shows a partial side view of the side located on the right in FIG. 1, FIG. 3 shows a top view of part of the outer circumferential surface of the rotor, FIG. 4 shows a front view of a second embodiment, and FIG. 5 shows a view, similar to that of FIG. 1, of the hub portion of an additional embodiment.

FIG. 1 shows a side view, part of which is a sectional view, of a first embodiment of the rotor according to the invention. For the sake of clarity, the lower half, which is constructed symmetrically with the upper half, was omitted. The rotor is provided with a hub 1, which is connected to a carrier in a suitable manner by means of radial bearings which are not shown in detail. If the rotor is used for a wind power station, it will be expedient to arrange the hub 1 in a horizontal position. The hub 1 is provided with axial bearing means 2, which are only schematically shown. If the rotor is used in a wind power station, the incoming air will be supplied, in accordance with FIG. 1, to the rotor from the right-hand side. The rotor is provided with an outer ring 3 and an inner ring 9, which are arranged coaxially with each other and with the hub 1 and which are supported essentially in the area of rotation of the axial bearing means 2. The outer ring 3 and the inner ring 9 are preferably constructed such that they define hollow channels, which are adapted to the respective mode of application in such a way that optimum flow behaviour is guaranteed. The outer ring as well as the inner ring are preferably made of reinforced plastic material. Spacers 12 are provided between the outer ring 3 and the inner ring 9, said spacers guaranteeing the coaxial position of the two rings 3, 9 as well as the distance at which they are arranged from each other. In the case of the embodiment shown, the spacers 12 are inserted in appropriate recesses of the outer ring 3 and of the inner ring 9. In addition, the spacers 12 are provided with central recesses through which flexible tension elements 7 and 14 can be passed. The tension elements 7 and 14 extend through the spacers 12, and in the area of the inner ring 9 they are deflected from their radial direction, which corresponds to the radial direction of the recess of the respective spacer 12, by means of respective deflection rollers 17, and then they are led towards the hub. The hub 1 is provided with two axially spaced deflection rollers 17, the tension elements 7, 14 being guided round said deflection rollers 17. The ends of the tension elements 7, 14 are secured to the central portion of a pressure element 6. The pressure element 6 is supported on the hub 1 as well as on the inner ring 9, preferably by means of a plug connection 15. The area in which the pressure element 6 as well as the two tension elements 7 and 14 are attached and which is located at the side of the hub is laterally displaced from the plane of rotation of the axial bearing means 2 when seen in the axial direction. As shown in FIG. 2, the tension elements 7, 14 are deflected in the circumferential direction by means of a deflection roller 8 in the area of the outer ring 3. The tension elements respectively embrace an arcuate section 5 of the outer ring 3 and are secured either to the nearest deflection roller 8 or, as shown in FIG. 3, to the deflection roller 8 coming after said nearest one. The tension elements 7, 14 are pretensioned with the aid of tensioning means 16, which may, for example, be constructed as a tension jack, so that the rotor has an appropriate stability. Due to the fact that the tension elements 7, 14 are pretensioned, a pressure is applied to the pressure element 6 so that said pressure element remains fixedly connected to the hub 1 and to the inner ring 9.

FIG. 2 shows a side view of the rotor ring side located on the right in FIG. 1. In the case of the embodiment shown, a rotor blade 4 is respectively provided in the area of the spacers 12, the structural design of said rotor blade 4 being not shown in detail. The shape of the rotor blade 4 can be adapted to the desired conditions of use, e.g. to the normally prevailing wind speed. The rotor blade 4 can either be attached to the spacers 12 or, in accordance with another possibility, said rotor blade 4 can be formed integrally with the spacers 12.

FIG. 3 shows a top view of the outer circumference of the outer ring 3, said figure showing, however, only part of the outer ring. As has already been described in connection with FIG. 1, the respective flexible tension elements 7, 14 are—after having passed the respective spacer 12—deflected in circumferential direction round the deflection roller 8. In the case of the embodiment shown, the end portion in question is fastened to the deflection roller 8 coming after the nearest deflection roller, the flexible tension element 7, 14 being preferably a wire rope whose end is bent to form a loop and is clamped by means of a clamping device which is not shown in detail. Fastening of the ends of the tension elements 7, 14 is preferably effected at a point inwards of the deflection area of the respective adjacent tension elements 7, 14 so that an intersection of the tension elements is avoided.

FIG. 1 to 3 show an embodiment in the case of which there are provided one pressure element 6 and two tension elements 7, 14. It is, however, also possible to use only one tension element 7. However, in this case said one tension element 7 is prefereably deflected and fastened in the central area of the deflection roller 8. If only one tension element 7 is used, it will be sufficient to provide only one spacer 12 in the central area of which a recess is provided.

The hub 1 can be formed in one piece; it is, however, also possible to combine said hub of several hub members which are arranged axially with respect to one another. Also the fastening of the pressure element 6 can be effected in many different ways, e.g. by means of additional clamping members.

FIG. 4 shows a front view of a second embodiment of the rotor according to the invention. In the case of this embodiment, the carrier ring is formed by the inner ring 9. The outer ring 3 and the inner ring 9 can be designed in the same way as in the case of the embodiment of FIG. 1-3. Several rotor blades 4 are again provided between the outer ring 3 and the inner ring 9, said rotor blades being only schematically shown. In the case of the example shown, the rotor blades 4 simultaneously serve as spacers for guaranteeing a predetermined distance between the two rings 3, 9. The outer ring 3 as well as the inner ring 9 are composed of several arcuate sections 5 of the outer ring and arcuate sections 11 of the inner ring, in which connection the term arcuate section is used in an ideal sense, but not in a material sense. The individual arcuate sections 5 of the outer ring 3 and the arcuate sections 11 of the inner ring 9 are interconnected by means of a plurality of flexible tension elements 10. As has already been described in connection with FIG. 1 to 3, each arcuate section 5 of the outer ring is provided with a deflection roller 8 which has secured thereto an end of the respective tension element 10. In the area of the outer circumference of the outer ring 3, the tension element 10 is led to the neighbouring deflection roller 8 and is deflected inwards round said deflection roller 8 in the radial direction and is then led to a deflection roller 18 of the respective arcuate section 11 of the inner ring. The tension element 10 is also deflected round this deflection roller 18 in the circumferential direction and is secured to the neighbouring deflection roller 18 of the neighbouring arcuate section 11 of the inner ring. Hence, the respective tension element 10 embraces one arcuate section 5 of the outer ring and one arcuate section 11 of the inner ring. For the purpose of tensioning the respective tension element 10, a tensioning means 16 is provided.

In analogy with the embodiment according to FIG. 1 to 3, the hub 1 is provided with several plug connections 15 having inserted therein pressure elements 6 which are fixed in position by means of tension elements 7, 14. The tension elements 7, 14 are each secured to a carrier 13 which is connected to the radially outward end of the pressure element 6. The carries 13 are adapted to be brought into engagement with the arcuate sections 11 of the inner ring in a manner which is not shown. Due to the fact that the arcuate sections 5 of the outer ring and the arcuate sections 11 of the inner ring are under the action of the tension elements 10, it is guaranteed that the rings 3, 9 are supported on the hub 1 in a suitable manner by means of the pressure elements 6 and the tension elements 7, 14. In the case of the embodiment shown in FIG. 4, the tension elements 7, 14 are provided with such a structural design that they have their respective ends secured to a carrier 13 and that they are deflected round the deflection roller 17 in the area of the hub. In the embodiment according to FIG. 4, which shows a front view of the rotor, two tension elements 7, 14 or only one tension element 7 may be used in analogy with the embodiment according to FIG. 1 to 3.

For the sake of clarity, each of FIG. 1 to 14 only shows a subarea of the rotor according to the invention. It goes without saying that several, at least three, tension elements 6 as weel as a corresponding number of tension elements 7, 14 must be provided round the rotational axis of the hub 1 so as to guarantee sufficient stability of the rotor. Preferably, there are provided six or twelve such arrangements of pressure elements 6 and tension elements 7, 14. In the case of the embodiments shown, the number of deflection rollers 8 as well as of the arcuate sections 5 of the outer ring and of the arcuate sections 11 of the inner ring as well as the number of rotor blades 4 correspond in an analogous manner to the number of arrangements of pressure elements 6 and tension elements 7, 14.

FIG. 5 shows an additional possibility of designing the hub 1 as well as the pressure elements 6 and the tension elements 7, 14. In analogy with the embodiment shown in FIG. 1, the deflection roller 17 for the tension element 14 is arranged on the hub 1, whereas the deflection roller 17 for the tension element 7 is secured by means of a carrier 19 at a radial distance form the hub 1. The two deflection rollers 17 are coupled by means of a strut 20. In the case of this embodiment, the tension elements 7, 14 approximately have the same length.

A characteristic property of the disclosed embodiments of the rotor according to the invention is that their mass is particularly small, whereby the resultant gyroscopic effects can also be restricted to correspondingly small values. Furthermore, the axial bearing means 2 is freely accessible so that it is possible to support the rotor in an appropriate manner in such a way that the still existing gyroscopic effects contribute to the stabilization of said rotor. Such a support of the rotor can be achieved e.g. by means of a cardanic suspension. Furthermore, it is possible to provide different numbers of rotor blades 4 and arrangements of pressure elements 6 as well as of tension elements 7, 14, for example six arrangements of pressure elements 6 and tension elements 7, 14 and twelve rotor blades 4.

I claim:
1. A rotor for a wind driven generator comprising:
(a) a hub;
(b) a plurality of plugs equally spaced around the circumference of the hub;
(c) a plurality of pressure elements where one pressure element is mounted into each plug;
(d) a plurality of carries where one carrier is disposed on the outward end of each pressure element;
(e) a plurility of hub deflector rollers equally displaced on the hub between each pressure element;
(f) a plurality of first tension elements where each tension element is:
  i. connected at one end to a carrier;
  ii. disposed around a hub deflection roller; and
  iii. connected at the other end to a carrier adjacent to the hub deflector roller;
(g) a plurality of first arcuate sections where one first arcuate section is disposed on each carrier and where the first arcuate sections form an inner ring;
(h) a plurality of first deflectors where one first deflector is disposed in each first arcuate section parallel to the longitudinal axis of the inner ring;
(i) an outer ring comprising a plurality of second arcuate sections disposed in essentially the same rotational plane as the inner ring where one second arcuate section corresponds to one first arcuate section;
(j) a plurality of blades disposed between a first arcuate section and its corresponding second arcuate section;
(k) a plurality of second deflector means where one second deflector means is disposed in each second arcuate section substantially parallel to the longitudinal axis of the outer ring;
(1) a plurality of second tension elements where each tension element is:
  i. connected at one end to a second deflection means;
  ii. disposed around an adjacent second deflector means in sliding relation;
  iii. disposed against a first deflector means in the first arcuate section which corresponds to a second arcuate section in which the second deflector means is disposed; and
  iv. connected at the other end to a first deflector disposed in the first arcuate section that corresponds to the first arcuate section in which the other end of the tension means is attached to the second deflector means.

* * * * *

UNITED STATES PATENT AND TRADEMARK OFFICE
CERTIFICATE OF CORRECTION

PATENT NO. : 4,936,750
DATED : June 26, 1990
INVENTOR(S) : Alberto Kling Heinz It is certified that error appears in the above-identified patent and that said Letters Patent is hereby corrected as shown below:

On the title page, under item [19], change "Heinz" to --Kling Heinz--; and in item [76], change "Alberto K. Heinz" to --Alberto Kling Heinz--.

Signed and Sealed this

Third Day of September, 1991

*Attest:*

HARRY F. MANBECK, JR.

*Attesting Officer*  *Commissioner of Patents and Trademarks*